(12) United States Patent
Headon

(10) Patent No.: US 6,324,386 B1
(45) Date of Patent: Nov. 27, 2001

(54) FOLDING COMMUNICATION DEVICE

(75) Inventor: David Roger Headon, Shepperton (GB)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/646,729
(22) PCT Filed: Mar. 19, 1999
(86) PCT No.: PCT/GB99/00880
§ 371 Date: Sep. 19, 2000
§ 102(e) Date: Sep. 19, 2000
(87) PCT Pub. No.: WO99/48264
PCT Pub. Date: Sep. 23, 1999

(30) Foreign Application Priority Data

Mar. 19, 1998 (GB) .................................. 9805948
Jul. 7, 1998 (GB) .................................. 9814739

(51) Int. Cl.$^7$ ..................................... H04B 1/38
(52) U.S. Cl. .......................... 455/90; 455/575; 455/550; D14/137; D14/138
(58) Field of Search ............................. 455/90, 550, 551, 455/575, 347, 348; 379/428, 433; D14/137, 138

(56) References Cited

U.S. PATENT DOCUMENTS

| D. 424,105 | * | 10/2000 | Huyn ................................. D14/138 |
| D. 434,402 | * | 11/2000 | Lee ................................... D14/138 |
| 5,493,690 | * | 2/1996 | Shimazaki ............................. 379/63 |
| 5,689,824 | * | 11/1997 | Nagai .................................. 455/550 |
| 5,706,332 | * | 1/1998 | Nagai .................................. 379/58 |
| 5,987,122 | * | 11/1999 | Daffara et al. ....................... 379/433 |
| 6,046,730 | * | 4/2000 | Bowen et al. ...................... 345/168 |
| 6,088,240 | * | 7/2000 | Steinhoff et al. ..................... 361/14 |
| 6,141,540 | * | 10/2000 | Richards et al. ....................... 455/90 |
| 6,151,486 | * | 11/2000 | Holshouser et al. .................. 455/90 |

FOREIGN PATENT DOCUMENTS

| 3346543A | 7/1995 | (DE) . |
| 0692899A | 1/1996 | (EP) . |
| 2254519A | 10/1992 | (GB) . |
| 04273639A | 9/1992 | (JP) . |
| 08316869 | * 5/1995 | (JP) ............................... H04B/1/38 |

* cited by examiner

Primary Examiner—William Trost
Assistant Examiner—Congvan Tran
(74) Attorney, Agent, or Firm—Dilworth & Barrese, LLP

(57) ABSTRACT

A mobile phone having a body and a pop-up cover which carries a loud speaker. The cover is hinged to the body of the phone and is movable between a closed position, wherein a surface of the cover overlies a surface of the phone body and an open position, where the cover does not overlie the surface of the phone body. The phone also includes a first engagement latch adjacent to the surface of the phone body, which is arranged to engage a second engagement surface to secure the phone in the closed position. The latch may be disengaged to allow the cover to move to the open position.

17 Claims, 5 Drawing Sheets

FOLDING COMMUNICATION DEVICE

The present invention relates to folding communication devices and in particular folding mobile telephones.

In recent years the demand for compact, lightweight mobile telephones has given rise to a variety of such telephones which have two housings which are joined by a hinge. This allows the two housings of the telephone to be folded together to conserve space when the telephone is not being used. Prior to use however, the telephone may be unfolded so that the two housing portions are at an obtuse angle to each other, one housing portion carrying a microphone and the other a loudspeaker.

Various mechanisms have been devised in order to hinge the two housing portions and to allow the user to open and close the hinge. One such device is disclosed in UK patent application GB 2300880 A, having a hinge which joins two housing portions of a mobile phone. In the hinge mechanism there is a torsional spring for providing the force for moving one of the housing bodies with respect to the other into the open position. There is also a latch mechanism in the hinge to resist the force of this spring, in order that when the phone is in the closed state it should normally remain closed.

The latch mechanism consists of a cam situated in the axis of the hinge which is stopped from rotating by a leaf spring mounted adjacent to it, and in turn stops the hinge from rotating. In order to open the phone, the user may depress a button situated at one end of the hinge, which has the effect of moving the cam out of engagement with the leaf spring, thus allowing the torsional spring to open the phone. Alternatively, the user may simply force the two housings of the phone apart. This has the effect of forcing the lobe of the cam past the leaf spring and again allowing the torsional spring to open the phone.

Whilst providing a mechanism allowing a folding phone to both be secured in the closed position and be openable by the user, this design requires a complex hinge and latching mechanism. Furthermore, as the torque of the torsional spring is resisted by the latch mechanism at the rotational axis of the hinge, the loads involved are relatively high. This requires the hinge to be relatively substantial and consequently relatively expensive to manufacture.

A further such telephone is disclosed in European patent application No. EP 0692899 A2. This device also has two housing portions hinged about a common axis. Again, the rotational force required to open the phone is supplied by torsional springs situated at the hinge axis. However, in this instance, the latching mechanism is provided by a catch situated on either side of one of the housing portions. Each of these catches is arranged to engage with corresponding locking grooves situated on the sides of the other housing portion in order to keep the phone in the closed position. In order to open the phone, the user must depress each of the catches simultaneously to release the locking grooves and allow, the phone to open.

Because of the requirement to depress both of the catches simultaneously, users may find such a latch mechanism difficult to use.

In accordance with the present invention there is provided a mobile phone having a pop-up button cover which carries a loud speaker, the button cover being hinged to the body of the phone and being movable between a closed position wherein a surface of the button cover overlies a surface of the phone body and an open position wherein the surface of the button cover does not overlies the surface of the phone body, the phone further comprising a first engagement means adjacent the surface of the phone body which is arranged to engage a second engagement means adjacent the surface of the button cover to secure the phone in the closed state, the phone body further carrying means to disengage the engagement means to allow the phone to move to the open position.

By employing a latch mechanism which engages the front surface of one housing portion, and at a position which is distal to the rotational axis of the hinge, a less substantial hinge mechanism is required than that disclosed in GB 2300880 A, for example. This has the added benefit of providing a latch mechanism which is simple and cost efficient to manufacture and assemble. Additionally, by locating the latch mechanism on the upper surface of the cover, the latching force is more evenly distributed across the housing members. Thus the problem of an unequal torsional force which may result if a single latch is employed on one side of the mobile phone body is reduced.

The invention will now be illustrated, by way of example only, with reference to the accompanying drawings, in which:

FIGS. 1a–c respectively show a rear elevation, a side elevation and a front elevation of a mobile phone according to the present invention, with the cover in the closed state.

FIGS. 2a–c respectively show a rear elevation, a side elevation and a front elevation of a mobile phone according to the present invention, with the cover in the open state.

FIGS. 3a–c show a series of partial perspective views of the latching mechanism of a mobile phone according to the present invention together with part of the casing of the phone; where FIG. 3a is a view from above with the cover in an open position;

Figure 1A:
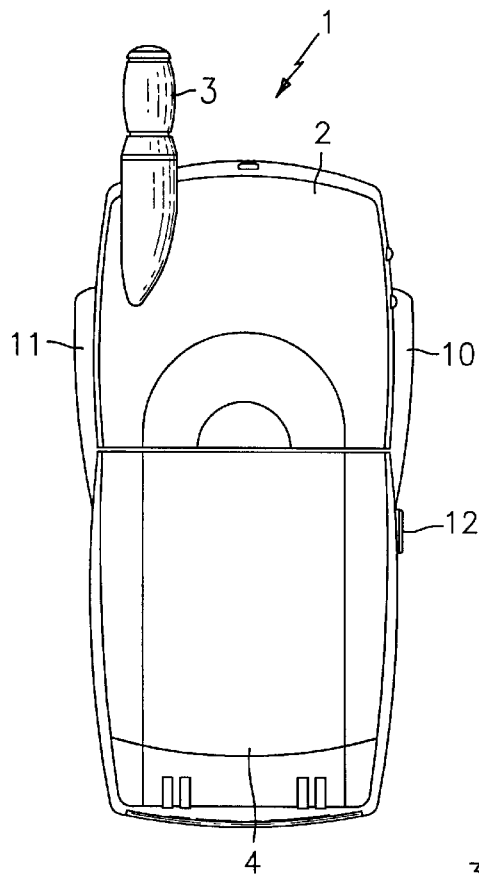
Figure 1C:
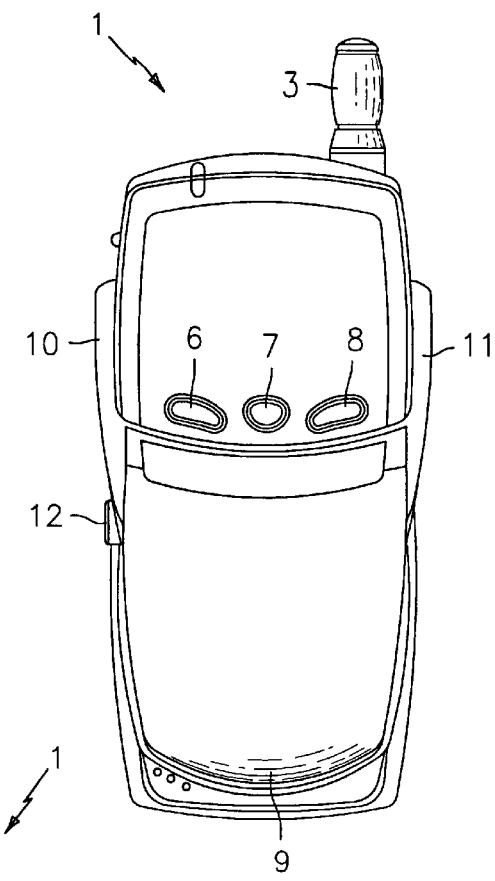
Figure 1B:
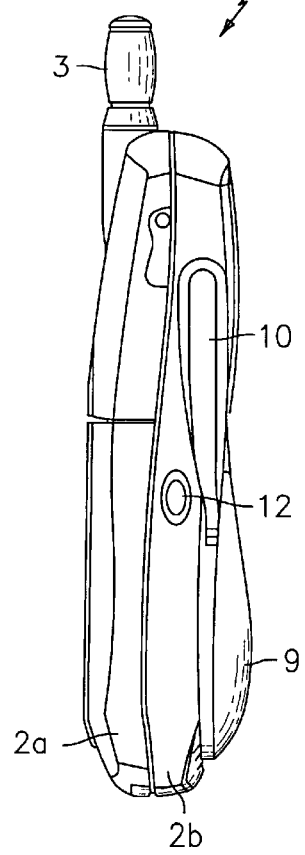

Referring to FIGS. 1 a–c, a mobile phone 1 according to the present invention is shown in its closed state from the rear, the side and in front, respectively. The mobile phone 1 comprises a body 2, to which an antenna 3 is connected. The body 2 is made from plastics material, using conventional injection moulding technology. The body 2 is made from two halves 2a and 2b shown in FIG. 1b. The body 2 comprises a removable back cover 4, which provides access to a battery (not shown). The body 2 houses a microphone into which the user speaks, together with the other electronic components and circuitry required in a mobile phone.

FIG. 1c shows a display screen 5 together with user operation buttons 6, 7 and 8. Reference numeral 9 denotes a cover, which is hinged to the phone body 2 by cover attachment arms 10, 11. The cover is openable through the actuation of cover actuation button 12.

Figure 2A:
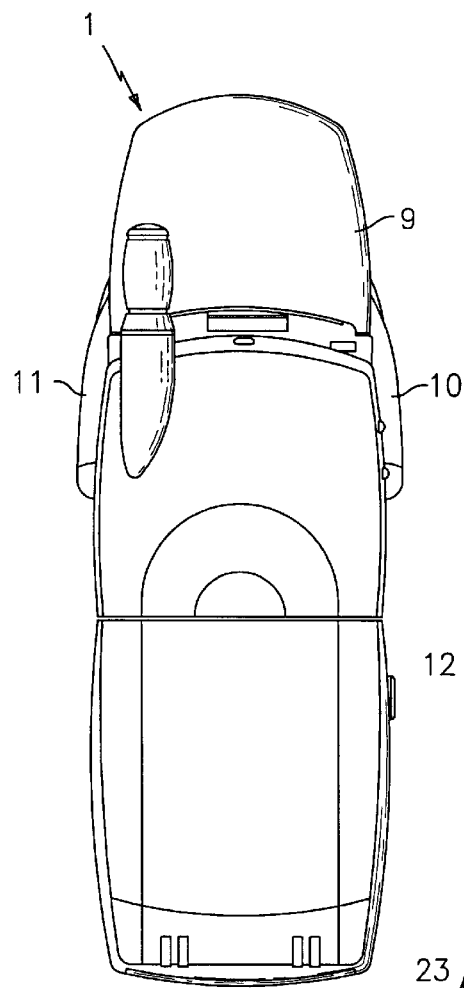
Figure 2B:
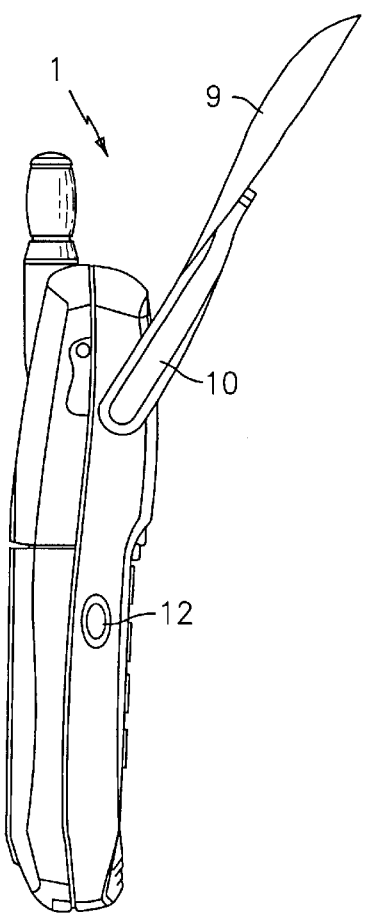
Figure 2C:
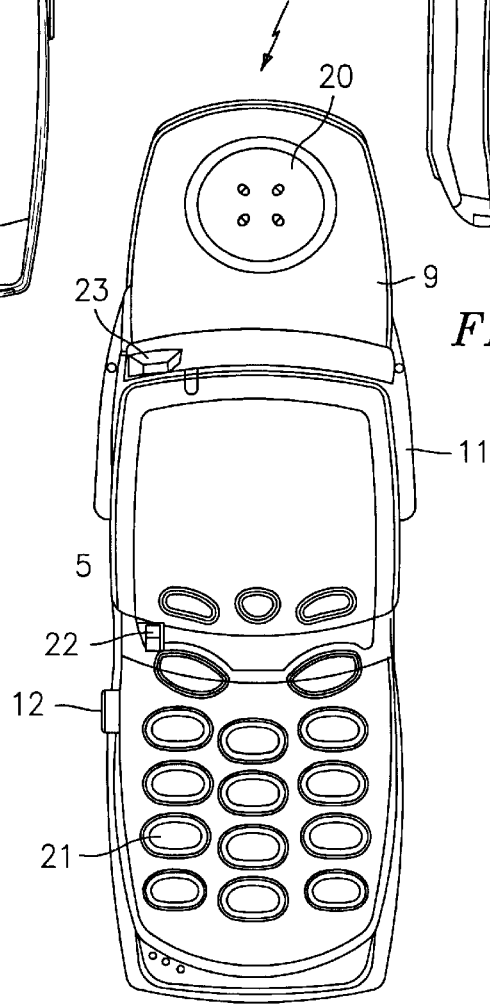

FIGS. 2a, 2b and 2c show the mobile phone in the same orientations as shown in FIG. 1, but with the cover 9 in the fully extended position, extending away from the body 2 of the phone at an obtuse angle. Referring to FIG. 2c, it can be seen that when the cover 9 is in the open position, a loudspeaker 20 is exposed. Thus. the user may hold the mobile phone 1 such that the loudspeaker 20 is positioned to his or her ear and the microphone is positioned near the user's mouth. The opening of cover 9 also exposes further user operation buttons and a numeric keypad 21.

Also visible in FIG. 2c are the cover retention latch 22, which secures the cover 9 when the phone is in the closed position by engaging the latch engagement surface 23, situated in the front surface of the cover 9.

Referring now to FIG. 3, the latch mechanism according to the present embodiment of the invention will now be described in more detail.

Figure 3A:
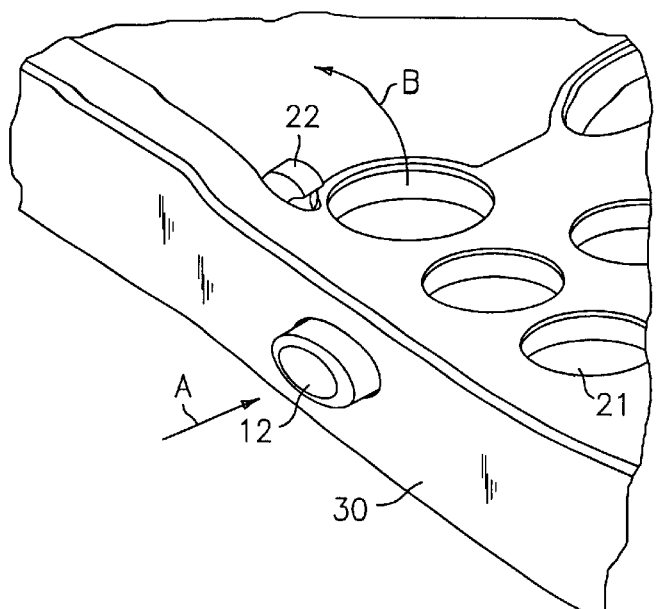
FIG. 3b is an internal view from below of the casing and latching mechanism shown in FIG. 3a; and, FIG. 3c is also a internal view from below of the casing and latching mechanism shown in FIG. 3a, but from a different orientation.

FIG. 3a shows a perspective view from above of the phone body 1 with the lower half 2a of the plastic moulding casing removed. Arrow "A" indicates the direction in which the cover actuation button 12 must be pressed by the user in order to open the cover 9. The cover retention latch 22 is also visible in this view and arrow "B" indicates the direction in which it rotates upon the cover actuation button 12 being depressed. It should be noted that in FIG. 3, the view is with the cover 9 already in the open position. and consequently the cover 9 is not visible. As can be seen from FIG. 3c, the cover retention latch 22 protrudes through an aperture 38 in the upper surface of the upper half 2b of the phone body 2. The aperture 38 is sufficiently large, as can be seen from FIG. 3c, to allow the cover retention latch 22 to move a sufficient distance to engage and disengage the latch engagement surface 23 in the cover 9.

Figure 3B:
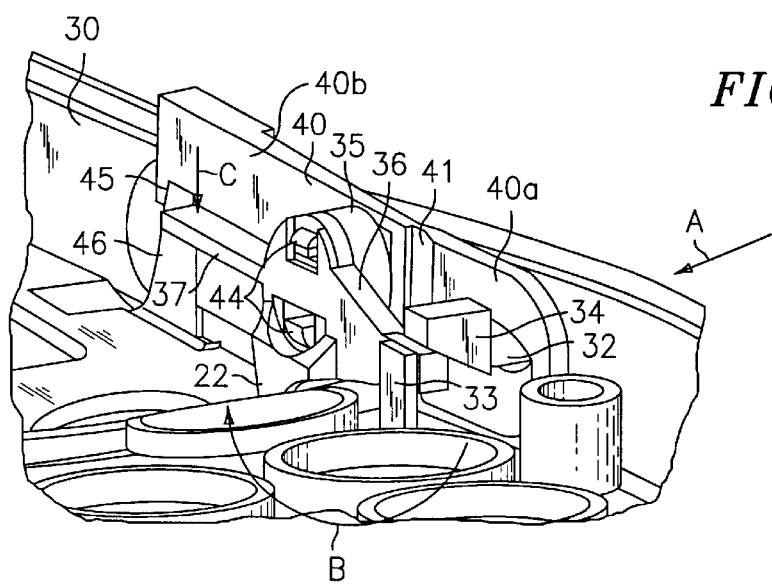
Figure 3C:
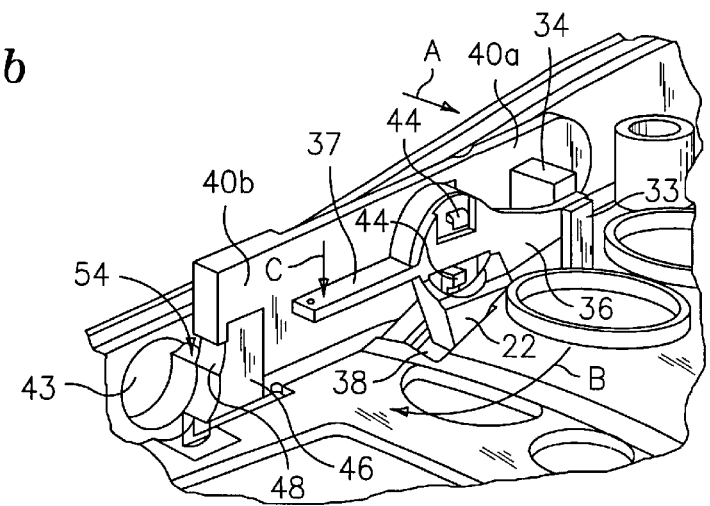

As is shown in FIGS. 3a, 3b and 3c, the latch mechanism comprises two main components, the latch body 35 and a support member 40. Both of these components are made from suitable plastics materials which are injection moulded.

The support member 40 comprises a waisted section 41 which allows one half 40a of the support member 40 to be flexed with respect to the other 40b. The support member 40 is attached by any suitable means, such as by adhesive, to the internal surface 30 of the upper body portion 2b of body 2, such that the half 40a of the support member 40 which comprises the cover actuation button 12, is free to move relative to the casing, by virtue of the waisted section 41 of the support member 40.

The support member 40 comprises snap fit attachments 44 which are designed to retain the latch body 35. The support member 40 is formed as a one piece moulding with the cover actuation button 12, to which it is joined by section 32 and the pivot actuation member 34.

The latch body 35 comprises a central boss in which are defined two apertures through which snap fit attachments 44 pass, thus retaining the latch body 35 in position. The apertures are oversized with respect to the snap fit attachments 44, thus allowing the latch body 35 a limited degree of rotational freedom.

The latch body 35 also has three arms. The first of these protrudes through the aperture 38 in the front of the phone body 2, as previously described, to form the cover retention latch 22. The cover retention latch 22 is formed from an arm portion which connects a hook portion, shaped to engage the latch engagement surface 23, to the remainder of the latch body. A pivot member 36 is the second of the arms of the latch body 35 and it extends from the central boss of the latch body 35 parallel to the support member 40 and passes between the support member 40 and a retaining body 33. The third arm of the latch body 35 is a return member 37.

Due to the limited degree of rotational freedom which the latch body 35 is allowed, the cover retention latch 22 may be rotated in the direction indicated by arrow "B" in FIG. 3, by the action of the angled surface of pivot actuation member 34 passing over the pivot member 36. Conversely, the cover retention latch 22 may be rotated in the opposite direction by the application of a force to the return member 37 in the direction of arrow "C", shown in FIGS. 3b and 3c.

It will be noted that support member 40 has a recess 45 in one end, in which a rubber stopper 46 is secured. This feature will be described in more detail below.

Figure 4A:
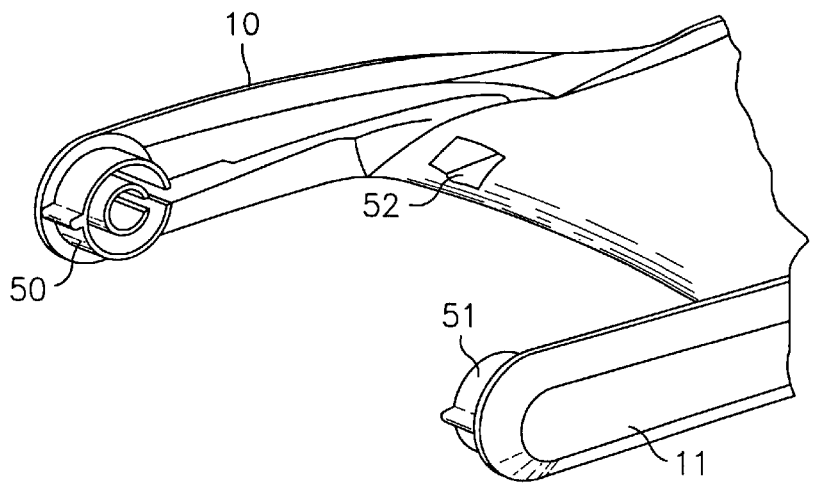
FIG. 4a shows a perspective view of the cover attachment arms.
Figure 4B:
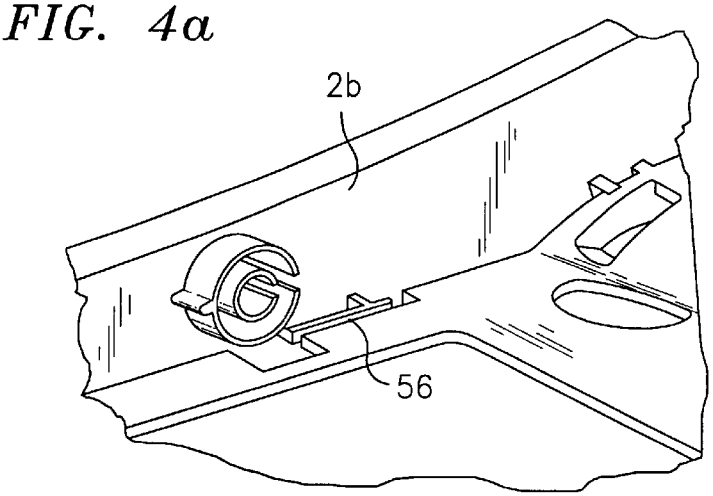
FIG. 4b shows a perspective view of a boss mounted in one cover attachment arm aperture in the mobile phone body.

The attachment of the cover attachment arms 10, 11 to the body portion 2b of the mobile phone will now be described, with reference to FIGS. 4 and 5.

At the end of each of the cover attachment arms 10, 11 there is situated a boss 50, and 51, respectively. These bosses 50, 51 are circular in cross section and arranged to be a sliding fit in circular apertures 43 on either side of the upper body moulding, 2b, best shown in FIG. 3c.

Figure 4C:
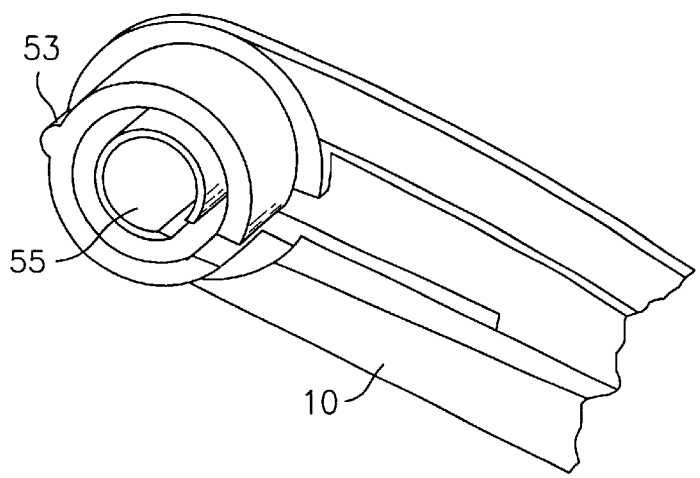
FIG. 4c shows an enlarged perspective view of the end of one cover attachment arm.
Figure 5A:
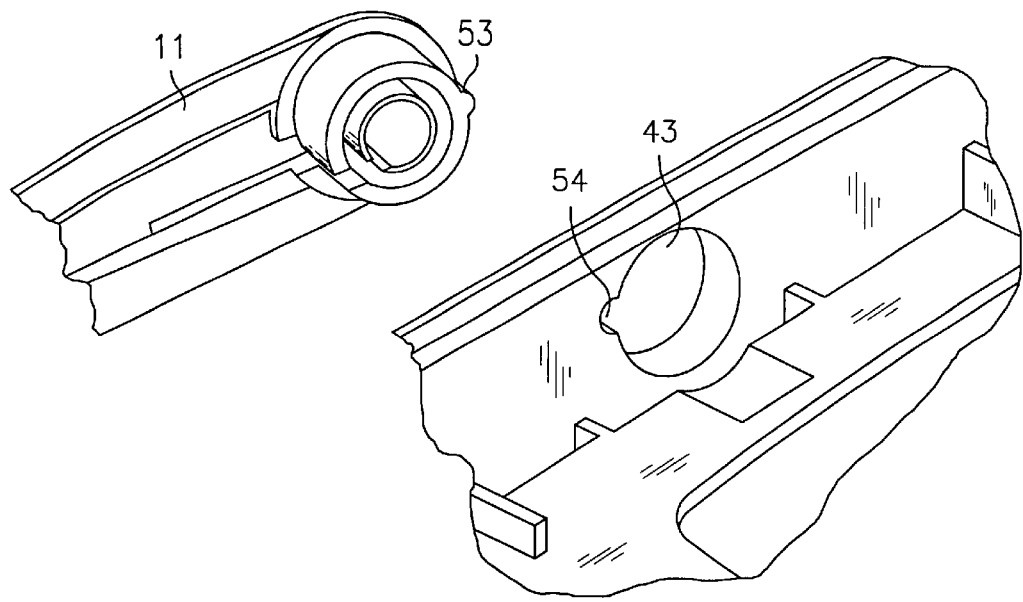
FIG. 5a shows a perspective view of the components in the attachment assembly of the first cover attachment arm in a disassembled state.
Figure 5B:
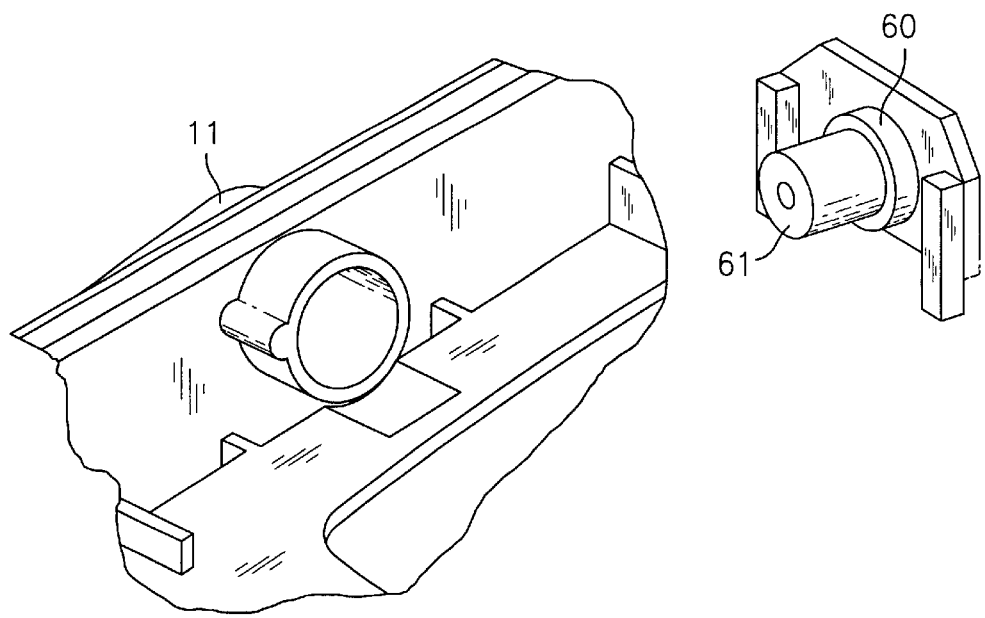
FIG. 5b shows a perspective view of the components in the attachment assembly of the second cover attachment arm in an assembled state.

Referring now to FIGS. 4c and 5a, the ends of attachment arms 10, 11 can be seen. It will be noted that the bosses 50, 51 comprise keys 53 on their outer surfaces. The keys 53 pass through corresponding keyways 54 in the attachment apertures 43. These key ways 54 can be seen in FIGS. 3c and 5a. The natural resilience of the plastics material from which the cover 9 and its attachment arms 10, 11 are made allows the arms to be splayed slightly in order that the bosses 50, 51 may be inserted into apertures 43 in assembly. The keys 53 do not run across the entire height of bosses 50, 51. Therefore, when bosses 50, 51 have been completely inserted into their corresponding apertures 43, the resilience of arms 10, 11 ensures that the bosses 50, 51 are fully inserted and as a result keys 53 pass completely through keyways 54. Thus, the keys 53 do not interfere with the rotation of the bosses 50, 51 in their mounting apertures 43.

In order that the cover 9 should move to its extended state when the cover actuation button 12 is depressed, a torsion spring (not shown) is fitted in the central void 55 of the boss 50 on the cover retention arm 10. One end of this spring is led along groove 56 of the casing of the phone body portion 2b, shown in FIG. 4b, thus allowing the spring to generate the torque to open the cover 9.

In order that the opening of cover 9 occurs in a controlled and smooth manner, the boss 53 on the end of the second cover attachment arm 11 does not contain a spring. Instead, it houses a restricter 60. The restricter 60 is fixed in place on the inner surface of the body portion 2b of the mobile phone such that its central boss 61 projects through the attachment aperture 43. Therefore, when the attachment arm 11 is fitted in place, the central boss 61 of the restricter 60 forms a sliding fit internal to the boss 53. Grease is applied to the engaging surfaces of the restricter boss 61 and the inner surface of boss 53 in order to increase friction between the two surfaces as they rotate with respect to one another. This has the effect of limiting the speed with which the opening of cover 9 occurs.

Mode of Operation

The mobile phone 1 is held in a hand of the user such that the cover actuation button 12 may be depressed using either a finger or thumb. This causes section 40a of the support member 40 to travel toward the retaining surface 33 in the direction of arrow "A" in FIG. 3, which is permitted by the resilience of the waisted portion 41 of the support member 40. This causes the pivot actuation member 34 to pass over the upper surface of the pivot member 36, as viewed in FIGS. 3b and 3c, by virtue of the angled profile of the lower surface of the pivot actuation member 34.

The further that the cover actuation button 12 is depressed, the greater is the downward force exerted by the pivot actuation member 34 on the pivot member 36. The presence of the retaining surface 33 prevents the pivot member 36 from moving in the direction of travel of the pivot actuation member 34. As a result, the pivot member 36 is forced to move downwards as viewed in FIGS. 3b and 3c.

Due to the downward movement of pivot member 36 the entire latch body 35 rotates, in the direction of arrow "B" as shown in FIGS. 3a, 3b and 3c. This is with the exception of the extreme end of return member 37 which is discussed below. This causes the cover attention latch 22 to rotate out of contact with the latch engagement surface 23 on the cover 9. This allows the cover 9 to rotate to its open position under the influence of the torsion spring located in boss 50.

When the cover actuation button 12 is released, the resilience of the waisted portion 41 of the support member 40 causes the deflected part 40a of the support member 40 to return to its initial position. This allows the latch body 35 and the cover retention latch to rotate back to their initial position. This is achieved by the natural resilience of the return member 37, the extreme end of which is held stationary by an internal component (not shown) of the mobile phone 1 against the rotation of the latch body.

As the cover 9 reaches its position of maximum extension, it is brought to rest by the key 53 of boss 50 of cover retention arm 10 coming into contact with an abutment surface 48 of rubber stopper 46. which is shown in FIG. 3c.

The skilled reader will appreciate that various modifications may be made to the latching mechanism described in this embodiment. The structure of the latching mechanism and the manner in which it is actuated by the user may be altered in order to match the requirements of particular embodiments. For example, the function of the return member 37 and the waisted portion 31 may be equally carried out with the use of springs of various types. Furthermore, the latch need not be arranged to operate in a pivoting manner. but may instead be designed to move linearly to disengage the cover.

Although the described embodiment describes an arrangement where the cover houses a loudspeaker and the body of the mobile phone houses a microphone, and where the cover houses the latch engagement surface and the body of the mobile phone houses the retention latch, either or both of these arrangements may be reversed.

It will also be appreciated that the retention latch may be designed either so that it passes completely through the housing portion which it engages, or that it engages a latch engagement surface internal to that housing portion.

What is claimed is:

1. A mobile phone having a body and a pop-up cover which carries a loud speaker, the cover being hinged to the body of the phone and being movable between a closed position wherein a surface of the cover overlies a surface of the phone body and an open position wherein the surface of the cover does not overlie the surface of the phone body, the mobile phone comprising a first engagement means adjacent the surface of the phone body which is arranged to engage a second engagement means adjacent the surface of the cover the secure the phone in the closed position, the phone body further carrying disengagement means to disengage the first and second engagement means to allow the cover to move to the open position;

wherein said disengagement means is located in and moveable in a plane that is substantially perpendicular to a plane in which the first and second engagement means is located and in which the first engagement means moves, said disengagement means operating in a direction parallel to a hinge axis of first engagement means.

2. A mobile phone according to claim 1, wherein the disengagement means is located on the side of the phone body.

3. A mobile phone according to claim 1, wherein the disengagement means is located relatively distant from the hinge.

4. A mobile phone according to claim 1, wherein the engagement means are located relatively close to the disengagement means.

5. A mobile phone according to claim 1, further comprising a display screen relatively near the hinge, wherein the cover comprises legs connected to the hinge, arranged such that the cover does not overlie the screen when it is in the closed position.

6. A mobile phone according to claim 1, wherein the first engagement means comprises a hook and the second engagement means comprises a hole in the cover, the hook being arranged to pass through the hole.

7. A mobile phone according to claim 2, wherein the disengagement means is located relatively distant from the hinge.

8. A mobile phone according to claim 2, wherein the engagement means is located relatively close to the disengagement means.

9. A mobile phone according to claim 3, wherein the engagement means is located relatively close to the disengagement means.

10. A mobile phone according to claim 2, further comprising a display screen relatively near the hinge, wherein the cover comprises legs connected to the hinge, arranged such that the cover does not overlie the screen when it is in the closed position.

11. A mobile phone according to claim 3, further comprising a display screen relatively near the hinge, wherein the cover comprises legs connected to the hinge, arranged such that the cover does not overlie the screen when it is in the closed position.

12. A mobile phone according to claim 9, further comprising a display screen relatively near the hinge, wherein the cover comprises legs connected to the hinge, arranged such that the cover does not overlie the screen when it is in the closed position.

13. A mobile phone according to claim 2, wherein the first engagement means comprises a hook and the second engagement means comprises a hole in the cover, the hook being arranged to pass through the hole.

14. A mobile phone according to claim 3, wherein the first engagement means comprises a hook and the second engagement means comprises a hole in the cover, the hook being arranged to pass through the hole.

15. A mobile phone according to claim 4, wherein the first engagement means comprises a hook and the second engagement means comprises a hole in the cover, the hook being arranged to pass through the hole.

16. A mobile phone according to claim 9, wherein the first engagement means comprises a hook and the second engagement means comprises a hole in the cover, the hook being arranged to pass through the hole.

17. A mobile phone according to claim 12, wherein the first engagement means comprises a hook and the second engagement means comprises a hole in the cover, the hook being arranged to pass through the hole.

* * * * *